J. C. BLUHM.
TRUSS FOR VEHICLES.
APPLICATION FILED DEC. 23, 1916.
1,294,606.
Patented Feb. 18, 1919.
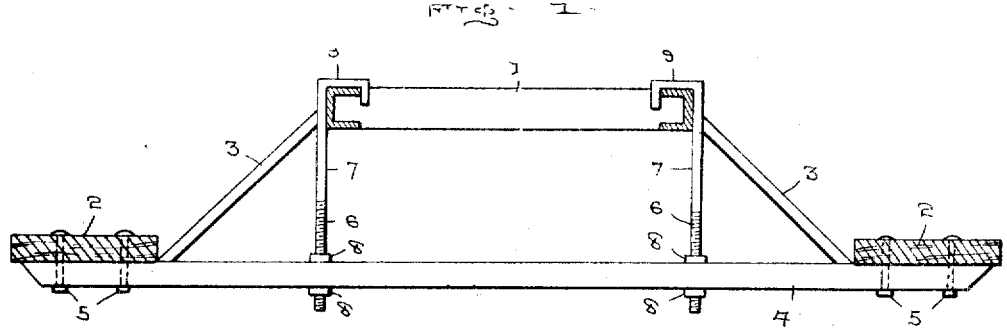
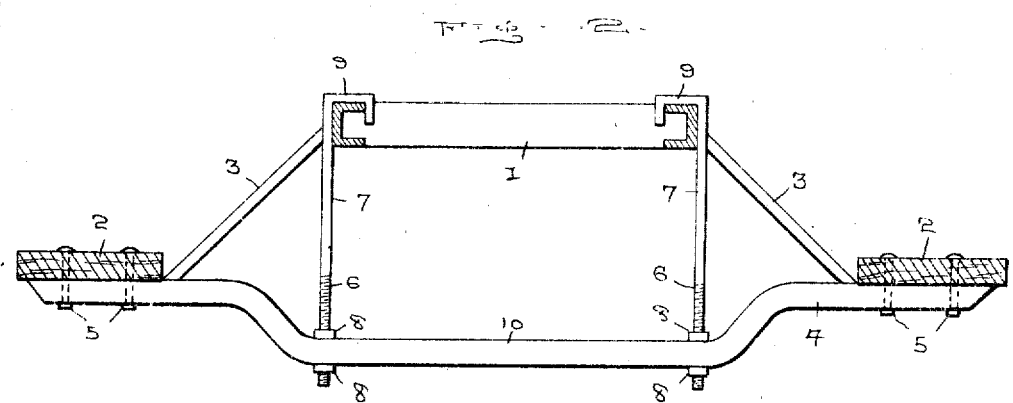
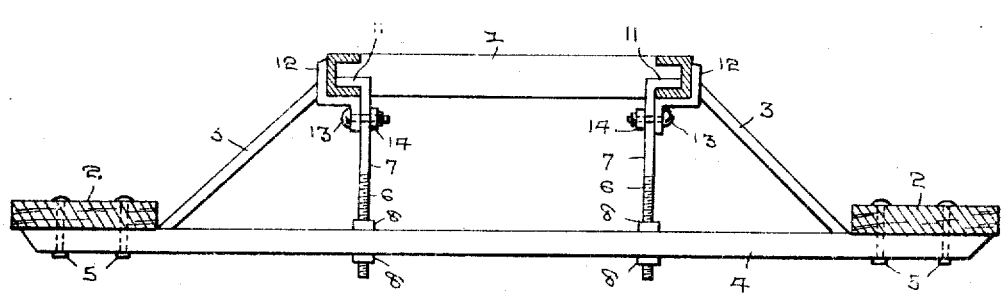
J. C. Bluhm INVENTOR
W. J. FitzGerald & Co. ATTORNEYS

UNITED STATES PATENT OFFICE.

JOHN C. BLUHM, OF WESTVILLE, INDIANA.

TRUSS FOR VEHICLES.

1,294,606.  Specification of Letters Patent.  Patented Feb. 18, 1919.

Application filed December 23, 1916. Serial No. 138,547.

*To all whom it may concern:*

Be it known that I, JOHN C. BLUHM, a citizen of the United States, residing at Westville, in the county of Laporte and State of Indiana, have invented certain new and useful Improvements in Trusses for Vehicles; and I do hereby declare the following to be a full, clear, and exact description of the invention, such as will enable others skilled in the art to which it appertains to make and use the same.

My invention relates to a truss for vehicles and is more particularly designed for use upon automobiles and automobile trucks for reinforcing the running boards and fenders of the same, though my invention is not limited to this specific use as the same is equally applicable to other vehicles for reinforcing the steps, running boards and fenders of buggies, carriages and the like.

One of the aims of my invention is to produce a truss for reinforcing the running boards and fenders of vehicles to prevent vibration and sagging thereof, as well as to restore the running boards and fenders to normal condition that have become sagged or distorted from any cause.

A further aim of my invention is to produce a truss provided with means for readily applying the same to an automobile or other vehicle regardless of the construction of the frame and its adjacent accessories.

A further aim of my invention is to provide a truss with means for adjustably mounting the same upon vehicles so as to accommodate the truss to vehicles of different forms and dimensions; and to also provide the truss with means so that the same may be efficiently applied to vehicles having parts lying in a plane below the plane of the steps or running boards of the vehicles.

These and other objects and advantages will more fully appear as the nature of the invention is more clearly understood from the following specification, the subject-matter of the claim, and the views illustrated in the accompanying drawings, in which, Figure 1 is a side elevation of the truss showing the same applied to a vehicle, the frame and the running boards of the vehicle being shown in section.

Fig. 2 is a view similar to Fig. 1, showing a slightly modified form of the truss.

Fig. 3 is a similar view to Fig. 1, showing a slightly modified form of the means for attaching the truss to the frame of the vehicle.

I desire to here state that for the sake of clearness and convenience in illustrating and describing my invention I have only shown and will describe such parts of the vehicle as will enable others to clearly understand the construction, use and application of my invention.

Referring to the drawings, wherein similar reference characters are employed to denote corresponding parts, 1 denotes the frame of the vehicle, which may be a solid bar frame or a channel iron frame as shown, and 2 denotes the running boards of the vehicle commonly employed and which running boards 2 carry at their ends, in the usual manner, fenders (not shown), the running boards 2 being supported upon the frame 1 by the usual straight or arched brace rods 3.

The truss constituting my invention consists of the bar 4, which is positioned transversely of the vehicle and has its ends secured to the under sides of the running boards 2 through the medium of the bolts 5, or other suitable securing means. However, the ends of the bar 4 may be secured to the running boards 2 through the medium of the bolts which secure the outer ends of the brace rods 3 to the running boards 2 if so desired.

Secured upon the bar 4 at suitable points from its ends are the threaded ends 6 of the tension rods 7, the threaded ends 6 of the tension rods 7 being adjustably mounted upon the bar 4 through the medium of the pairs of adjusting nuts 8 upon each of the tension rods 7, the nuts of each pair being positioned at opposite sides of the bar 4. For attaching the rods 7, as shown in Figs. 1 and 2, to the frame 1 of the vehicle, the rods 7 are provided at their upper ends with the substantially inverted U-shaped hook members 9 which embrace and bear upon the upper surfaces of the frame 1 and are supported thereby, that is, the tension rods 7 support the bar 4 upon the frame 1 which in turn supports the running boards 2 secured upon the ends thereof.

The bar 4 shown in Fig. 1 is a straight bar and is sufficient for ordinary purposes, but in vehicles, and especially certain makes of automobiles and trucks, there are certain parts of the vehicle, which lie below the plane of the steps or running boards thereof and to adapt my truss to vehicles of this latter class I form the bar 4 with the depressed member or yoke 10, the only differences in the construction of Fig. 1 and the construction of Fig. 2 is the depressed member or yoke 10 formed in the bar 4 and the length of the tension rods 7.

In Fig. 3 I have shown a slightly different manner of attaching the tension rods 7 to the frame 1 of the vehicle whereby to render my invention efficiently applicable to the frame of a vehicle wherein the surrounding accessories of the frame 1 will not admit of the employment of the hook members 9 or the tension rods 7 shown in Figs. 1 and 2, and in this instance, I provide the tension rods 7 shown in Fig. 3 with the angle arms 11, preferably disposed in opposite directions to each other so that the arms 11 will engage and be supported by the upper surfaces of the lower angle member of the frame 1, and to prevent the arms 11 of the tension rods 7 from becoming disengaged from the frame 1 by lateral movement, I employ the substantially Z-shaped brackets 12 having one of their stems engaging the outer surface of the frame 1 and its other stem secured to the upper portions of the tension rods 7 through the medium of U-bolts or the ordinary bolts 13 and the clamping plates 14.

I preferably construct the bar 4 of solid metal, but I may construct the same of any form of angle iron or steel or of hard wood, and the various parts of my truss may be formed of any suitable dimensions and shapes to meet the exigencies of the case.

In applying my invention to vehicles any number of trusses made in accordance with my invention may be employed, that is, only one truss may be employed at the transverse center of the vehicle, or two may be employed one at each end of the running boards of the vehicle, or if found necessary and desirable three of these trusses may be employed by placing one intermediately of the trusses at the ends of the running boards, or in other words any number of trusses may be employed and attached to the under sides of the running boards 2 at any suitable and desirable points.

My truss when carefully applied and adjusted upon a vehicle will efficiently prevent objectional vibration of the running boards and fenders, which vibration is conveyed to the body of the vehicle to the annoyance of the occupants therein, and as my truss eliminates this objectional feature the body of the vehicle is unaffected and greater ease of riding is made possible.

Another feature of my invention is that the truss absolutely prevents any sagging or distortion of the running boards and the fenders from any cause or amount of weight placed thereon and again when my truss is applied to a vehicle wherein the running boards and fenders have become sagged the same may be restored to normal condition by the proper adjustment of the bar 4 upon the tension rods 7 through the means of the adjusting nuts upon the threaded ends of the tension rods.

Having described my invention, what I claim as new and desire to secure by Letters Patent, is:—

The combination of an angle iron a vehicle frame and the running boards thereof, a reinforcing bar having attaching ends secured to the undersides of said running boards, supporting rods rigidly and adjustably secured through said reinforcing bar, right angular arms upon the upper ends of said supporting rods for overhanging the lowermost flange members of said vehicle frame and at the inner sides thereof, substantially Z-shaped brackets having one of their members secured to said rods and their other members engaging the under faces and outer sides of the vehicle frame for maintaining the angle arms of said supporting rods in operative position upon the vehicle frame.

In testimony whereof I have signed my name to this specification in the presence of two subscribing witnesses.

JOHN C. BLUHM.

Witnesses:
L. R. CASS,
R. W. STREET.